(12) United States Patent
Sbiaa et al.

(10) Patent No.: US 7,123,451 B2
(45) Date of Patent: Oct. 17, 2006

(54) THIN-FILM MAGNETIC HEAD FOR READING MAGNETIC INFORMATION ON A HARD DISK BY UTILIZING A MAGNETORESISTANCE EFFECT

(75) Inventors: Rachid Sbiaa, Chuo-ku (JP); Mikio Matsuzaki, Chuo-ku (JP); Haruyuki Morita, Chuo-ku (JP)

(73) Assignee: TDK Corporation, Tokyo (JP)

( * ) Notice: Subject to any disclaimer, the term of this patent is extended or adjusted under 35 U.S.C. 154(b) by 95 days.

(21) Appl. No.: 10/668,998

(22) Filed: Sep. 24, 2003

(65) Prior Publication Data

US 2004/0114284 A1  Jun. 17, 2004

(30) Foreign Application Priority Data

Sep. 25, 2002  (JP) .......................... P2002-279569

(51) Int. Cl.
*G11B 5/33* (2006.01)
(52) U.S. Cl. ...................................... 360/322
(58) Field of Classification Search ..................... None
See application file for complete search history.

(56) References Cited

U.S. PATENT DOCUMENTS 5,701,223 A * 12/1997 Fontana et al. ........ 360/324.11
5,715,121 A *  2/1998 Sakakima et al. ....... 360/324.2
6,198,609 B1 *  3/2001 Barr et al. .................. 360/322
6,219,212 B1 *  4/2001 Gill et al. ................ 360/324.2
6,833,979 B1 * 12/2004 Knapp et al. ............... 360/322
6,836,392 B1 * 12/2004 Carey et al. ........... 360/324.11

FOREIGN PATENT DOCUMENTS

JP    A 2000-105912    4/2000

* cited by examiner

*Primary Examiner*—David Davis
(74) *Attorney, Agent, or Firm*—Oliff & Berridge, PLC

(57) ABSTRACT

The thin-film magnetic head of the present invention is provided with an antiferromagnetic layer, a pinned layer whose direction of magnetization is fixed by exchange-coupling with the antiferromagnetic layer, a free layer whose direction of magnetization varies according to external magnetic field, an intermediate layer disposed between the pinned layer and free layer, and a pair of electrode layers for supplying a sense current in a layer thickness direction of the free layer. One electrode layer is connected to the pinned layer. Due to this configuration, a sense current flows through the free layer, the intermediate layer, and the pinned layer, but basically does not flow through the antiferromagnetic layer. As a consequence, the antiferromagnetic layer does not contribute to total resistance of the magnetoresistance element, allowing a high magnetoresistance ratio to be obtained.

7 Claims, 14 Drawing Sheets

THIN-FILM MAGNETIC HEAD FOR READING MAGNETIC INFORMATION ON A HARD DISK BY UTILIZING A MAGNETORESISTANCE EFFECT

BACKGROUND OF THE INVENTION

1. Field of the Invention

The present invention relates to a thin-film magnetic head for reading magnetic information on a hard disk or the like by utilizing a magnetoresistance effect, a head gimbal assembly, a hard disk apparatus, and a method of making a thin-film magnetic head.

2. Related Background Art

MR (Magneto Resistive) heads have been in use as thin-film magnetic heads for reading magnetic information on hard disks. The MR heads utilize a magnetoresistance effect in which a magnetic material changes its ohmic value due to changes in external magnetic fields (e.g., leakage magnetic fields from hard disks) when a current is caused to flow through the magnetic material. This magnetoresistance effect can be substantially realized by an MR film that stacks a pinned layer having a direction of magnetization that is fixed by exchange-coupling with an antiferromagnetic layer, a free layer having a direction of magnetization that varies according to external magnetic fields, an intermediate layer disposed therebetween. In GMR (Giant Magneto Resistive) heads utilizing a giant magnetoresistance effect, the intermediate layer is formed from an electrically conductive material such as Cu.

A predetermined sense current is supplied to the MR film of a magnetic head. Then, the angle between the respective directions of magnetization of the pinned layer and the free layer changes due to external magnetic fields. The resistance of the MR element is lowest when the respective directions of magnetization of the individual layers coincide with each other, and is highest when the directions of magnetization are opposite to each other. Reading such a change in resistance as a voltage value can reproduce the magnetic information written on hard disks.

Meanwhile, in thin-film magnetic heads, a CIP (Current In Plane) structure in which the sense current flows in the planar direction of the MR film and a CPP (Current Perpendicular to Plane) structure in which the sense current flows in a direction (film thickness direction) perpendicular to the MR film have been developed (for example, see Japanese Patent Application No. 2000-105912 (FIG. 2)). Since a magnetic shield layer itself can be used as an electrode, the later CPP structure is substantially free from short-circuiting (insulation failure) between the magnetic shield layer and MR film which may become problematic in the narrower lead gap to be achieved in the CIP structure. Therefore, the CPP structure is quite advantageous in attaining a higher recording density on hard disks. Examples of heads employing the CPP structure include TMR (Tunnel-type Magneto Resistive) heads utilizing the magneto resistance effect occurring in tunnel junctions, and CPP-GMR heads.

SUMMARY OF THE INVENTION

However, the conventional thin-film magnetic heads having a CPP structure have the following problem. Conventionally, a pair of electrode layers for supplying the sense current to the MR film is normally formed on the upper side of the MR film and the lower side of the antiferromagnetic layer, respectively. Namely, the sense current also flows through the antiferromagnetic layer that does not directly contribute to magnetoresistance changes. As a consequence, the antiferromagnetic layer generates a so-called parasitic resistance, and the magnetic head fails to yield a high magnetoresistance ratio.

In order to overcome the above-mentioned problem, it is an object of the present invention to provide a thin-film magnetic head, a head gimbal assembly, a hard disk apparatus, and a method of making a thin-film magnetic head, which can realize a high magnetoresistance ratio.

The thin-film magnetic head of the present invention comprises an antiferromagnetic layer; a pinned layer whose direction of magnetization is fixed by exchange-coupling with the antiferromagnetic layer; a free layer whose direction of magnetization varies according to external magnetic field; an intermediate layer disposed between the pinned layer and the free layer; and a pair of electrode layers for supplying a sense current to the free layer in a layer thickness direction of the free layer, one of the electrode layers being connected to the pinned layer.

In such a thin-film magnetic head, the sense current flows through the free layer, the intermediate layer, and the pinned layer, but basically does not flow through the antiferromagnetic layer. Therefore, the antiferromagnetic layer does not develop resistance to the sense current, whereby a high magnetoresistance ratio can be obtained.

Preferably, in the thin-film magnetic head of the present invention, the pinned layer comprises a first ferromagnetic layer in contact with the antiferromagnetic layer, a second ferromagnetic layer whose direction of magnetization is opposite to that of the first ferromagnetic layer, and a nonmagnetic spacer layer disposed between the first and second ferromagnetic layers; the one electrode layer connected to the pinned layer being in contact with a track-width side face of the second ferromagnetic layer but not in contact with a track-width side face of the first ferromagnetic layer.

When the pinned layer is constituted by two layers having directions of magnetization that are opposite to each other, a magnetic field is closed between the first and second ferromagnetic layers, whereby the influence of the magnetic field of the pinned layer upon the free layer can be greatly reduced. The inventors have also found that, when the pinned layer are formed in such a configuration, the maximum resistance change (difference between the resistance value at the time when the respective magnetizations of the free layer and pinned layer are parallel and the resistance value at the time when they are anti-parallel) can be made higher if the sense current is caused to flow through the second ferromagnetic layer alone without flowing through the first ferromagnetic layer, whereby the magnetoresistance ratio can be improved. Namely, when a configuration in which the electrode layer connected to the pinned layer is in contact with a track-width side face of the second ferromagnetic layer but not in contact with a track-width side face of the first ferromagnetic layer is employed, the sense current basically flows through the second ferromagnetic layer but not through the first ferromagnetic layer, whereby a high magnetoresistance ratio can be realized.

Preferably, in the case where the pinned layer comprises the first and second ferromagnetic layers, a face of the second ferromagnetic layer opposing the first ferromagnetic layer has an area smaller than that of a face of the first ferromagnetic layer opposing the second ferromagnetic layer.

For obtaining the second ferromagnetic layer having a desirable pattern, a mask corresponding to this pattern is utilized. When the above-mentioned area of the second ferromagnetic layer is smaller than the above-mentioned area of the first ferromagnetic layer, the whole surface of the face of the second ferromagnetic layer on the first ferromagnetic layer side can oppose the first ferromagnetic layer even if the mask forming position shifts to some extent. As a consequence, the magnetization of the second ferromagnetic layer can be firmly fixed, whereby the so-called pin inversion can be effectively suppressed.

Also, in the thin-film magnetic head according to the present invention, the pinned layer, the intermediate layer, and the free layer may be disposed between a substrate and the antiferromagnetic layer, and the other electrode layer of the pair of electrode layers that is not connected to the pinned layer is disposed between said free layer and said substrate. In this case, a method in which a buffer layer is formed on an electrode layer and the free layer is formed thereon can be performed. Therefore, it is easier to control the growth of the free layer, thereby increasing the sensitivity of the free layer.

In the thin-film magnetic head of the present invention, the intermediate layer may be formed from an electrically conductive material. In this case, the thin-film magnetic head becomes a so-called GMR head of CPP structure. Alternatively, the intermediate layer may be formed from an insulating material, so as to become a TMR head. Although it is unlikely that the CPP-GMR head will yield a magnetoresistance ratio as high as that of a TMR head, a magnetoresistance ratio higher than that conventionally available can be realized in the configuration of the present invention.

The head gimbal assembly of the present invention is a head gimbal assembly having a thin-film magnetic head mounted with a gimbal; the thin-film magnetic head comprising an antiferromagnetic layer; a pinned layer whose direction of magnetization is fixed by exchange-coupling with the antiferromagnetic layer; a free layer whose direction of magnetization varies according to external magnetic field; an intermediate layer disposed between the pinned layer and the free layer; and a pair of electrode layers for supplying a sense current in a layer thickness direction of the free layer, one of the electrode layers being connected to the pinned layer.

The hard disk apparatus of the present invention is a hard disk apparatus comprising a hard disk adapted to write magnetic information therein, and a thin-film magnetic head for reading the magnetic information on the hard disk; the thin-film magnetic head comprising an antiferromagnetic layer; a pinned layer whose direction of magnetization is fixed by exchange-coupling with the antiferromagnetic layer; a free layer whose direction of magnetization varies according to external magnetic field; an intermediate layer disposed between the pinned layer and the free layer; and a pair of electrode layers for supplying a sense current to the free layer in a layer thickness direction of the free layer, one of the electrode layers being connected to the pinned layer.

The head gimbal assembly and hard disk apparatus can realize a high reproducing output in the hard disk apparatus since they are equipped with the above-mentioned thin-film magnetic head.

The method of making a thin-film magnetic head in accordance with the present invention comprises the steps of forming an antiferromagnetic layer; forming a pinned layer whose direction of magnetization is fixed by exchange-coupling with the antiferromagnetic layer; forming a free layer whose direction of magnetization varies according to external magnetic field; forming an intermediate layer disposed between the pinned layer and the free layer; and forming a pair of electrode layers for supplying a sense current to the free layer in a layer thickness direction of the free layer, one of the electrode layers being formed so as to be connected to the pinned layer.

In the thin-film magnetic head thus is obtained, the sense current flows through the free layer, the intermediate layer, and the pinned layer, but basically does not flow through the antiferromagnetic layer. Therefore, the antiferromagnetic layer does not develop resistance to the sense current, whereby a high magnetoresistance ratio can be obtained.

Preferably, in the method of making a thin-film magnetic head in accordance with the present invention, the pinned layer comprises a first ferromagnetic layer in contact with the antiferromagnetic layer, a second ferromagnetic layer whose direction of magnetization is opposite to that of the first ferromagnetic layer, and a nonmagnetic spacer layer disposed between the first and second ferromagnetic layers; the one electrode layer connected to the pinned layer being formed in contact with a track-width side face of the second ferromagnetic layer but not in contact with a track-width side face of the first ferromagnetic layer.

In the thin-film magnetic head thus obtained, the sense current basically flows through the second ferromagnetic layer but not through the first ferromagnetic layer, whereby a high magnetoresistance ratio can be realized.

Preferably, in the method of making a thin-film magnetic head in accordance with the present invention, the pinned layer comprises a first ferromagnetic layer in contact with the antiferromagnetic layer, a second ferromagnetic layer whose direction of magnetization is opposite to that of the first ferromagnetic layer, and a nonmagnetic spacer layer disposed between the first and second ferromagnetic layers; the method comprising the steps of obtaining said first ferromagnetic layer; forming a magnetic layer to become said second ferromagnetic layer so as to cover said first ferromagnetic layer; and patterning said magnetic layer by utilizing a mask so as to obtain said second ferromagnetic layer having a desirable form; whereas a projected area of the mask onto the first ferromagnetic layer is smaller than the area of a face of the first ferromagnetic layer opposing the mask.

When a mask having such a size is utilized, the whole surface of the face of the second ferromagnetic layer on the first ferromagnetic layer side can oppose the first ferromagnetic layer even if the mask forming position shifts to some extent. As a consequence, the magnetization of the second ferromagnetic layer can be firmly fixed, whereby the so-called pin inversion can be effectively suppressed.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

In the following, preferred embodiments of the present invention will be explained in details with reference to the accompanying drawings. Constituents identical to each other will be referred to with identical numerals without repeating their corresponding descriptions.

[First Embodiment]

Figure 1:
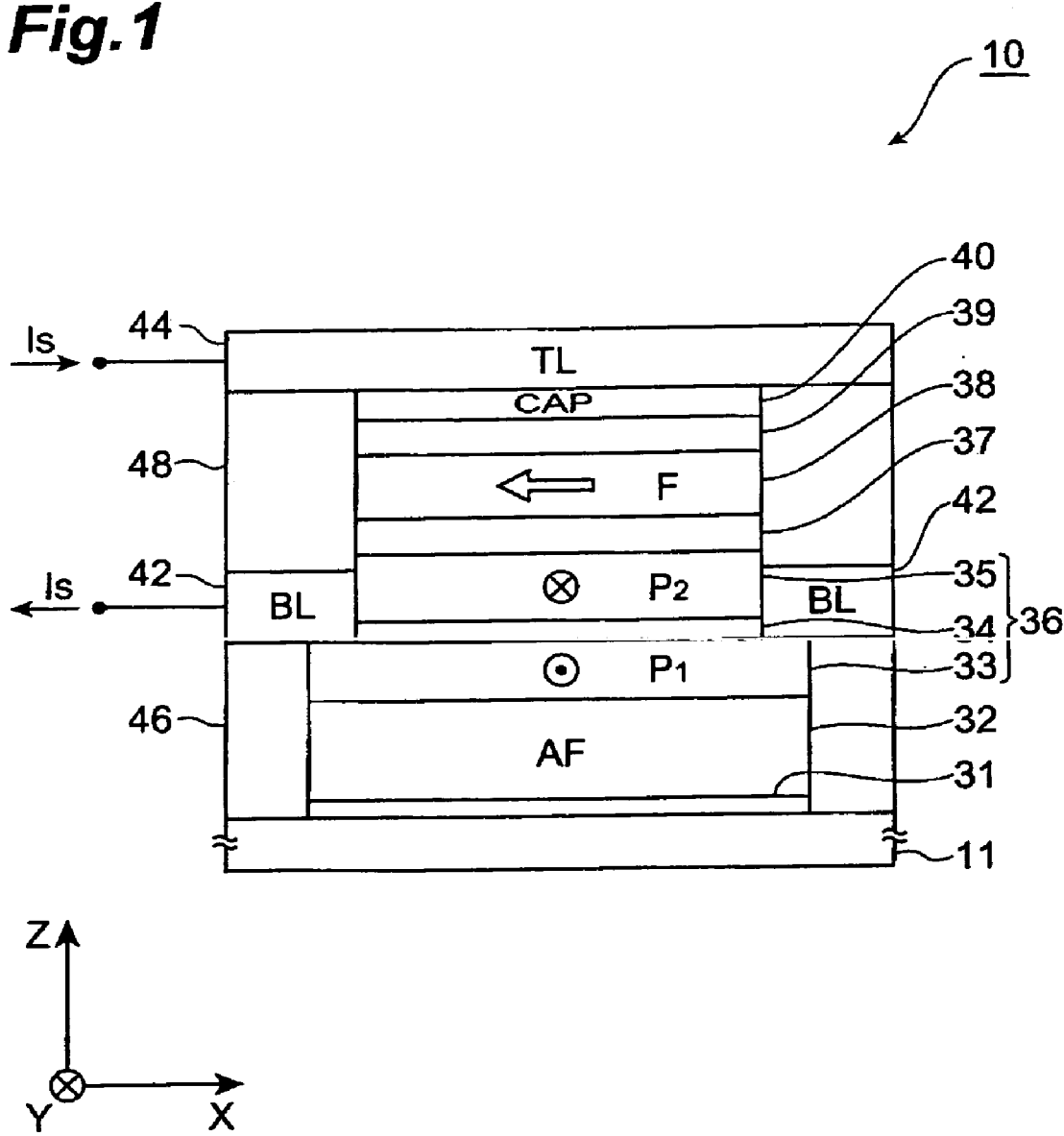
FIG. 1 is a schematic view showing the first embodiment of the thin-film magnetic head in accordance with the present invention.

FIG. 1 is a view schematically showing the thin-film magnetic head in accordance with an embodiment, illustrating a vicinity slightly inside from its recording medium opposing face (hereinafter referred to as the "air bearing surface (ABS)" side) The thin-film magnetic head 10 is a GMR head utilizing a giant magnetoresistance effect. It comprises a buffer layer 31; an antiferromagnetic layer (referred to as "AF" in the drawing) 32; a pinned layer 36 having a three-layer structure, whose direction of magnetization is fixed by exchange-coupling with the antiferromagnetic layer 32; an electrically conductive layer (intermediate layer) 37; a free layer (referred to as "F" in the drawing) 38 whose direction of magnetization varies according to external magnetic field; an electrically conductive layer 39; and a cap layer (referred to as "CAP" in the drawing) 40 which are successively stacked on a substrate 11.

The thin-film magnetic head 10 employs a so-called CPP (Current Perpendicular to Plane) structure in which a sense current $I_s$ flows in a layer thickness direction of the free layer 38. By way of a pair of electrode layers, the sense current $I_s$ is supplied to an MR film constituted by the free layer 38, electrically conductive layer 37, and the like. Electrode layers comprise a lower electrode layer (referred to as "BL" in the drawing) 42 and an upper electrode layer (referred to as "TL" in the drawing) 44. The upper electrode layer 44 is formed so as to cover the cap layer 40, whereas the lower electrode layer 42 is directly connected to the pinned layer 36.

A region surrounding the antiferromagnetic layer 32 between the substrate 11 and the lower electrode layer 42 is formed with an insulating layer 46, and a region surrounding the free layer 38 between the lower electrode layer 42 and the upper electrode layer 44 is formed with an insulating layer 48. The insulating layers 46, 48 can be formed from $Al_2O_3$, $SiO_2$ or the like and prevent the sense current $I_s$ from leaking.

The respective configurations of the individual layers will now be explained in detail. The substrate 11 is formed from AlTiC ($Al_2O_3.TiC$) or the like, and the buffer layer 31 formed thereon has a thickness from about 1 nm to about 10 nm. The buffer layer 31 can be formed from a conductive material such as Ta, NiFe, NiCr, NiFeCr, or the like, for example.

The antiferromagnetic layer 32 is a layer for fixing the direction of magnetization of the pinned layer 36. The antiferromagnetic layer 32 has a thickness from about 5 nm to about 20 nm, and can be formed from PtMn, IrMn or the like. Materials that may be employed for forming the antiferromagnetic layer are either those that exhibit antiferromagnetism even without heat treatment and induce an exchange-coupling magnetic field with respect to a ferromagnetic material, or those that exhibit antiferromagnetism upon heat treatment.

The pinned layer 36 comprises a first ferromagnetic layer (referred to as "$P_1$" in the drawing) 33 in contact with the antiferromagnetic layer 32, a second ferromagnetic layer (referred to as "$P_2$" in the drawing) 35 whose direction of magnetization is opposite to that of the first ferromagnetic layer 33, and a nonmagnetic spacer layer 34 disposed between the layers 33, 35, thereby attaining a so-called synthetic structure.

The first ferromagnetic layer 33 and second ferromagnetic layer 35 can be formed from CoFe or the like, for example, and the total thickness of the layers 33, 35 may be from about 4 nm to about 15 nm.

The nonmagnetic spacer layer 34 is formed from a nonmagnetic material such as Ru, Rh, Re, Cr, Zr, or the like, for example, and its thickness is from about 0.2 nm to about 1.2 nm, for example. The nonmagnetic spacer layer 34 generates ferromagnetic exchange coupling between the first ferromagnetic layer 33 and the second ferromagnetic layer 35, thereby making the respective directions of magnetization of the layers 33, 35 opposite to each other. As shown in FIG. 1, the magnetization of the first ferromagnetic layer 33 is directed to the air bearing surface (in the −Y direction), whereas the magnetization of the second ferromagnetic layer 35 is fixed to the Y direction. The respective directions of magnetization in the first ferromagnetic layer 33 and second ferromagnetic layer 35 may be opposite to those shown in FIG. 1 as well.

The face of the second ferromagnetic layer 35 opposing the first ferromagnetic layer 33 has an area smaller than that of the face of the first ferromagnetic layer 33 opposing the second ferromagnetic layer 35. In other words, the first ferromagnetic layer 33 is wider than the second ferromagnetic layer 35 when seen from the top of the drawing. The nonmagnetic spacer layer 34 has substantially the same area as that of the second ferromagnetic layer 35 when seen from the top of the drawing.

The lower electrode layer 42 is deposited on the region of first ferromagnetic layer 33 not covered with the nonmagnetic spacer layer 34 and second ferromagnetic layer 35, and on the insulating layer 46. That is, the lower electrode layer 42 is in contact with the track-width side faces of the second ferromagnetic layer 35 (in the X direction in the drawing)

but not in contact with the track-width side faces of the first ferromagnetic layer 33. The height of the lower electrode layer 42 in the Z direction in FIG. 1 is lower than the upper face of the second ferromagnetic layer 35 so as not to be in contact with the electrically conductive layer 37, thereby preventing a short-circuiting between the electrically conductive layer 37 and the lower electrode layer 42. The lower electrode layer 42 can be formed from an electrically conductive material such as Cu, NiFe and so on. The upper electrode layer 44 can be formed from a material similar to that of the lower electrode layer 42.

The electrically conductive layer 37 is disposed between the pinned layer 36 and the free layer 38, and is formed from an electrically conductive material such as Cu. The electrically conductive layer 37 has a thickness of several nanometers, for example.

The direction of magnetization of the free layer 38 changes under the influence of leakage magnetic fields of recording media such as hard disks. It has a thickness from about 1 nm to about 5 nm, and can be formed from a ferromagnetic material such as Fe, Co, Ni, FeCo, FeCoNi, CoZrNb, or the like, for example. Also, from the magnetic flux from a hard bias layer (not depicted) comprising CoTa, CoCrPt, CoPt, or the like, the free layer 38 is caused to have a single domain in the −X direction in the drawing (which may be the X direction as well). As the air bearing surface comes closer to a magnetization transition area of a hard disk, the direction of magnetization of the free layer 38 changes so as to approach the positive or negative direction of Y axis. As the direction of magnetization of the free layer 38 changes, the current flowing through the electrically conductive layer 37 increases if the direction of magnetization of the second ferromagnetic layer 35 oriented in the Y-axis direction and the direction of magnetization of the free layer 38 coincide with each other, but decreases if the respective directions of magnetization are opposite to each other.

The electrically conductive layer 39 is formed from an electrically conductive material such as Cu, for example. It is not always necessary to provide the electrically conductive layer 39. The cap layer 40 is formed from an electrically conductive material such as Ta, for example.

The thin-film magnetic head 10 in accordance with this embodiment is configured as in the foregoing. Thus configured thin-film magnetic head 10 yields the following effects. Since the lower electrode layer 42 is directly connected to the pinned layer 36, the sense current $I_s$ flows through the free layer 38, the electrically conductive layer 37, and the pinned layer (which is the second ferromagnetic layer 35 here), but basically does not flow through the antiferromagnetic layer 32. As a consequence, the antiferromagnetic layer 32 does not develop so-called parasitic resistance to the sense current, whereby a high magnetoresistance ratio can be obtained. Further, the antiferromagnetic layer 32 can be made thick, since it does not develop parasitic resistance. As a result, the magnetization of the pinned layer 36 becomes stable, thereby suppressing the pin inversion.

The lower electrode layer 42 is in contact with the track-width side faces of the second ferromagnetic layer 35, but not in contact with the track-width side faces of the first ferromagnetic layer 33. As a consequence, the sense current $I_s$ basically flows through the second ferromagnetic layer 35 but not through the first ferromagnetic layer 33. The inventors have found that causing such a sense current $I_s$ flow can raise the maximum resistance change (the difference between the resistance value at the time when the respective magnetizations of the free layer and pinned layer are parallel and the resistance value at the time when they are antiparallel), thereby improving the magnetoresistance ratio.

As mentioned above, the face of the second ferromagnetic layer 35 that opposes the first ferromagnetic layer 33 has an area smaller than that of the first ferromagnetic layer 33 that opposes the second ferromagnetic layer 35. Therefore, when obtaining the second ferromagnetic layer 35 having a desirable pattern by utilizing a mask, the whole surface of the face of the second ferromagnetic layer 35 on the first ferromagnetic layer 33 side can oppose the first ferromagnetic layer 33 even when the position of the mask shifts to some extent. As a consequence, the magnetization of the second ferromagnetic layer 35 can firmly be fixed, thereby suppressing effectively the so-called pin inversion.

A method of making a thin-film magnetic head in accordance with the present invention will now be explained with reference to FIGS. 2 to 9.

Figure 2:
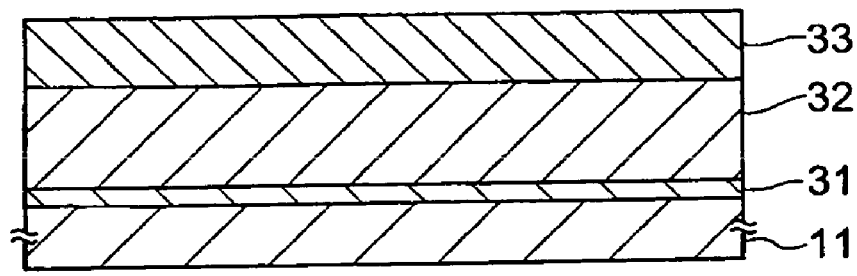
FIG. 2 is a view showing a step in the manufacture of the thin-film magnetic head, illustrating the stacking of the first ferromagnetic layer and layers thereunder.

First, as shown in FIG. 2, a buffer layer 31, an antiferromagnetic layer 32, and a first ferromagnetic layer 33 are stacked on a disk-shaped substrate 11 in this order, for example, by sputtering. This drawing shows a part of the disk-shaped substrate 11.

Figure 3:
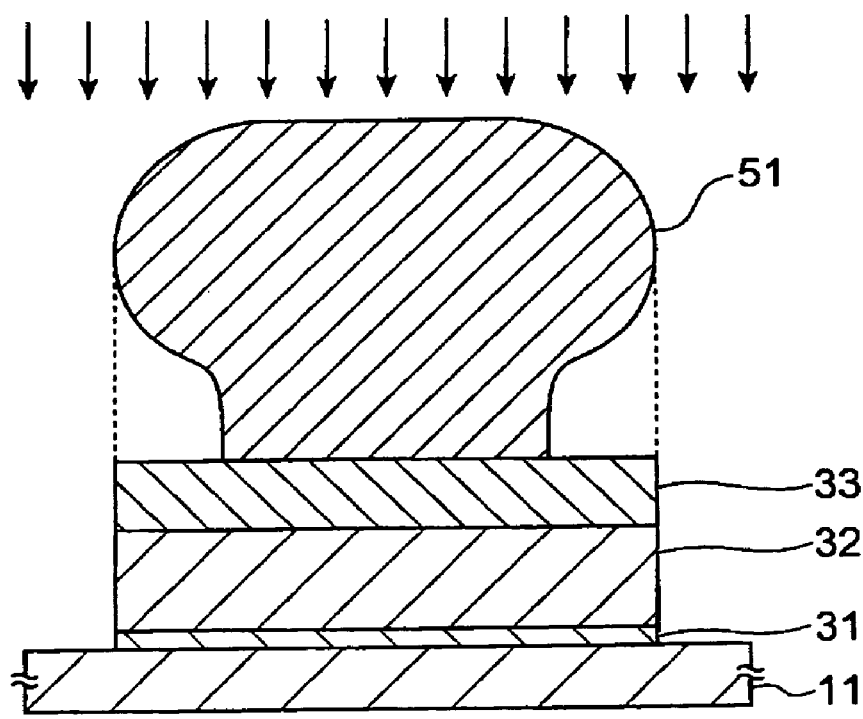
FIG. 3 is a view showing the patterning of the first ferromagnetic layer and antiferromagnetic layer by utilizing a mask.

Subsequently, as shown in FIG. 3, a mask 51 is formed on the first ferromagnetic layer 33, and the buffer layer 31, the antiferromagnetic layer 32, and the first ferromagnetic layer 33 are patterned in conformity to the mask form, for example, by ion milling or the like. The mask 51 can be formed by the steps of coating the surface of the intermediate with a resist adapted to polymerize upon irradiation with light or an electron beam, irradiating the resist with light or an electron beam, and developing the resist. For facilitating liftoff, which will be explained later, a dent may be preferably formed under the mask 51 by a known technique. In practice, a lot of masks 51 are formed in a matrix on the substrate 11 in accordance to the number of thin-film magnetic heads to be obtained.

Figure 4:
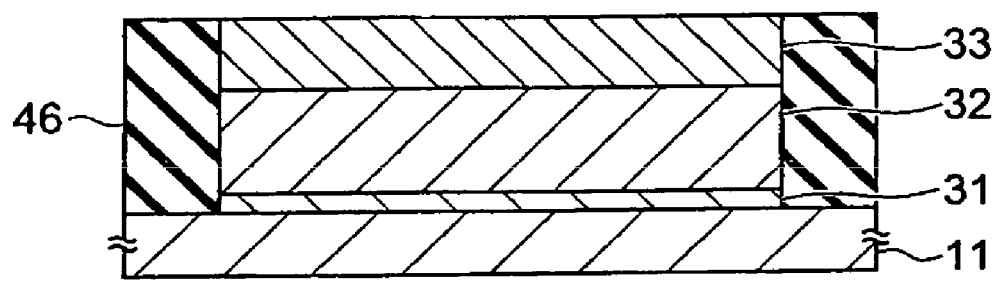
FIG. 4 is a view showing a step after forming an insulating layer at the side of the first ferromagnetic layer and antiferromagnetic layer and after liftoff.

With reference to FIG. 4, the next step will be explained. First, while the mask 51 remains in place, an insulating layer 46 is deposited on the whole surface of the intermediate. Subsequently, the mask 51 is peeled off so as to carry out liftoff, thereby removing the mask and the materials deposited thereon.

Figure 5:
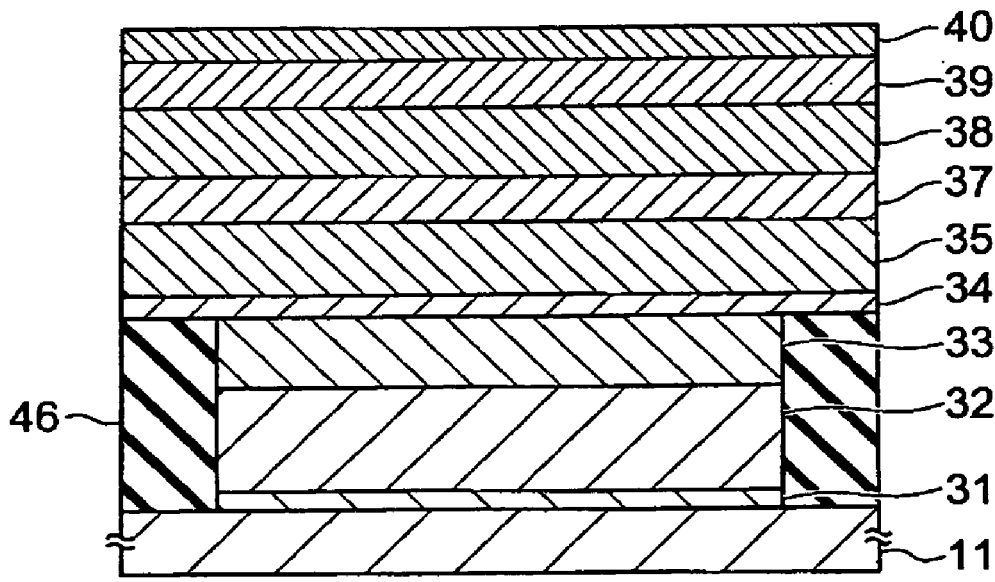
FIG. 5 is a view showing a state where a nonmagnetic spacer layer to a cap layer are stacked.

Next, as shown in FIG. 5, a nonmagnetic spacer layer 34, a second ferromagnetic layer (strictly speaking a layer that will become the second ferromagnetic layer after this layer is patterned) 35, an electrically conductive layer (intermediate layer) 37, a free layer 38, an electrically conductive layer 39, and a cap layer 40 are stacked in this order, for example, by sputtering.

Figure 6:
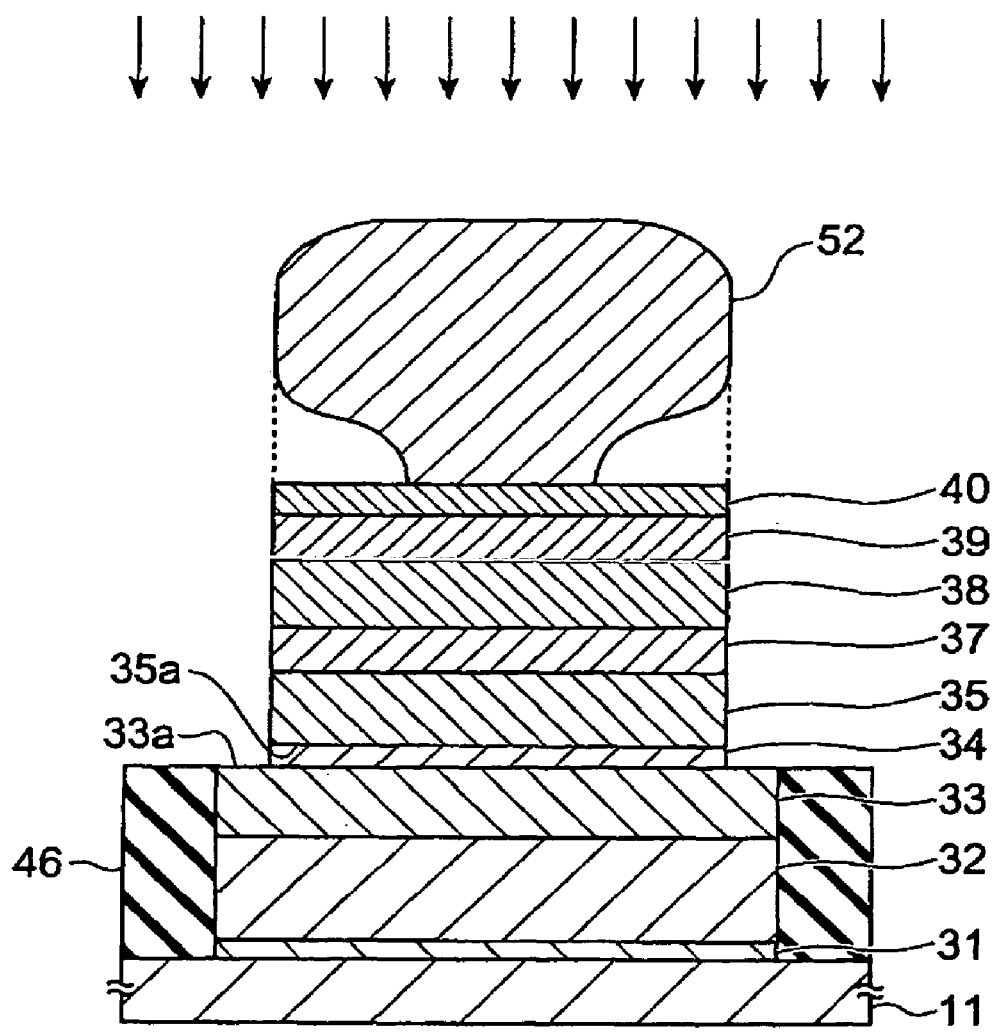
FIG. 6 is a view showing a state where the cap layer to the nonmagnetic spacer layer are patterned by utilizing a mask.

Subsequently, as shown in FIG. 6, a mask 52 is formed on the cap layer 40, and the layers from the cap layer 40 to the nonmagnetic spacer layer 34 are patterned in conformity to the mask form. The mask 52 can be formed by a technique similar to that of the mask 51 described previously.

Here, the projected area of the mask 52 onto the first ferromagnetic layer 33 is an area smaller than the area of the face 33a (the upper face in the drawing) of the first ferromagnetic layer 33 opposing the mask 52. Namely, the first ferromagnetic layer 33 is wider than the mask 52 when the intermediate is seen from the top of the drawing. While the mask 52 is formed after it is put in position using irradiating alignment marks with an electron beam on the substrate 11, there is a risk that it will be formed in a position that slightly deviates from the target position due to ultrafine processing. When the mask 52 has the size mentioned above, however, the whole surface of the face 35a of the second ferromagnetic layer 35 that faces the first ferromagnetic layer 33 can oppose the first ferromagnetic layer 33 even if the location of the mask 52 is shifted slightly. Therefore, the magnetization of the second ferromagnetic layer 35 can firmly be fixed, thereby effectively suppressing so-called pin inversion. As with the second ferromagnetic layer 35, the whole surface of the nonmagnetic spacer layer 34 opposes the first ferromagnetic layer 33.

Figure 7:
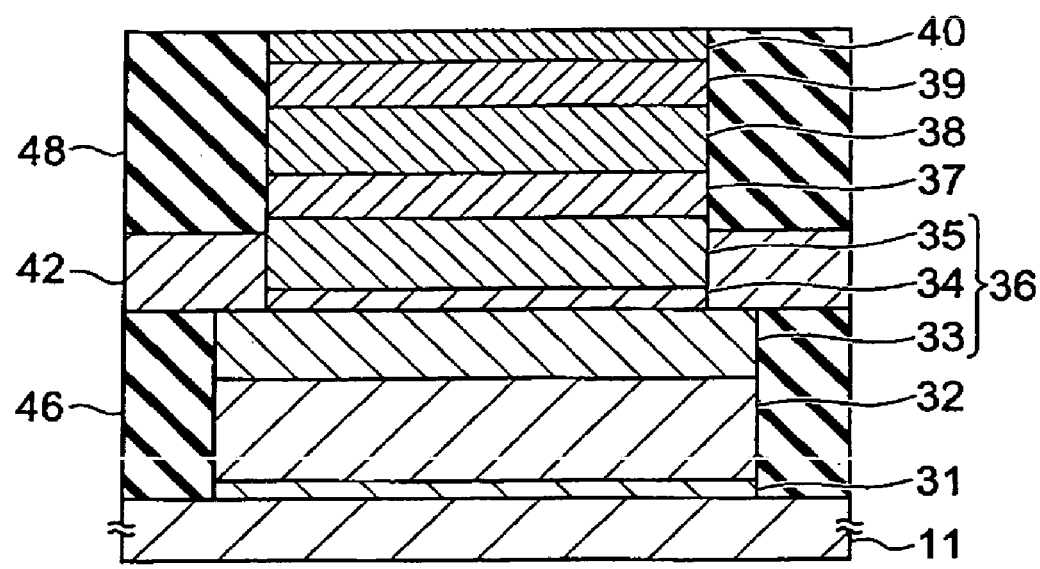
FIG. 7 is a view showing a scone where a side part of a second ferromagnetic layer is formed with a lower electrode layer, and an insulating layer is further formed thereon.

With reference to FIG. 7, the next step will be explained. First, with the mask 52 still in place, a lower electrode layer 42 is formed by sputtering, plating, IBD (Ion Beam Deposition), or the like. Here, the lower electrode layer 42 is formed so as to be in contact with the track-width side faces of the second ferromagnetic layer 35 but not in contact with the track-width side faces of the first ferromagnetic layer 33. When the lower electrode layer 42 is formed, the sense current basically flows through the second ferromagnetic layer 35, but not through the first ferromagnetic layer 33, thereby realizing a high magnetoresistance ratio. After forming the lower electrode layer 42, an insulating layer 48 is deposited on the whole surface of the intermediate by sputtering or the like. Thereafter, the mask 52 is pealed off, so as to carry out liftoff, thereby removing the mask and the materials deposited thereon.

Figure 8:
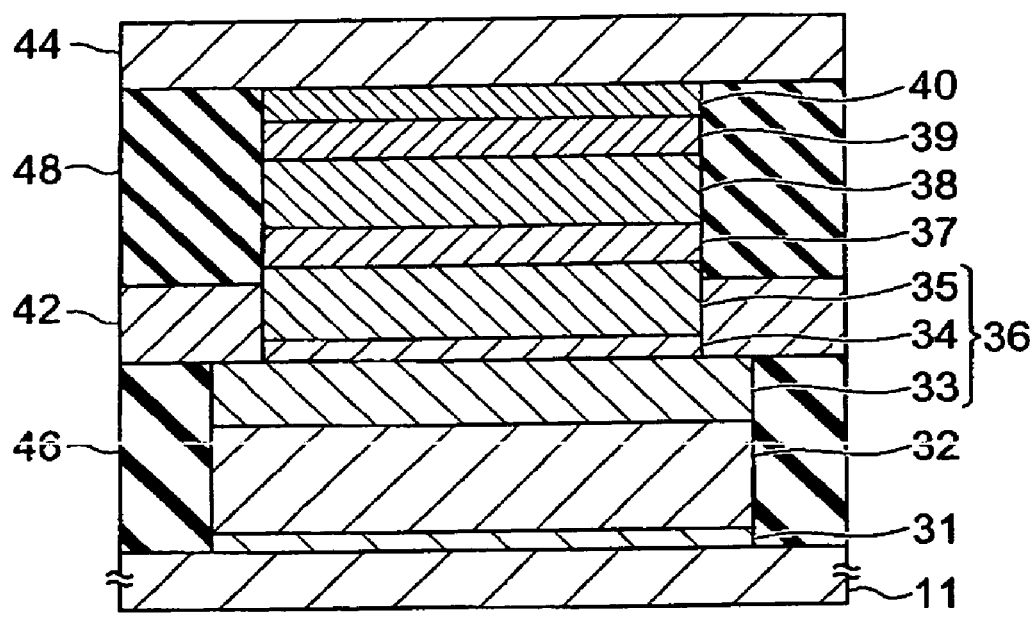
FIG. 8 is a view showing a state where an upper electrode layer is formed on the cap layer.
Figure 9:
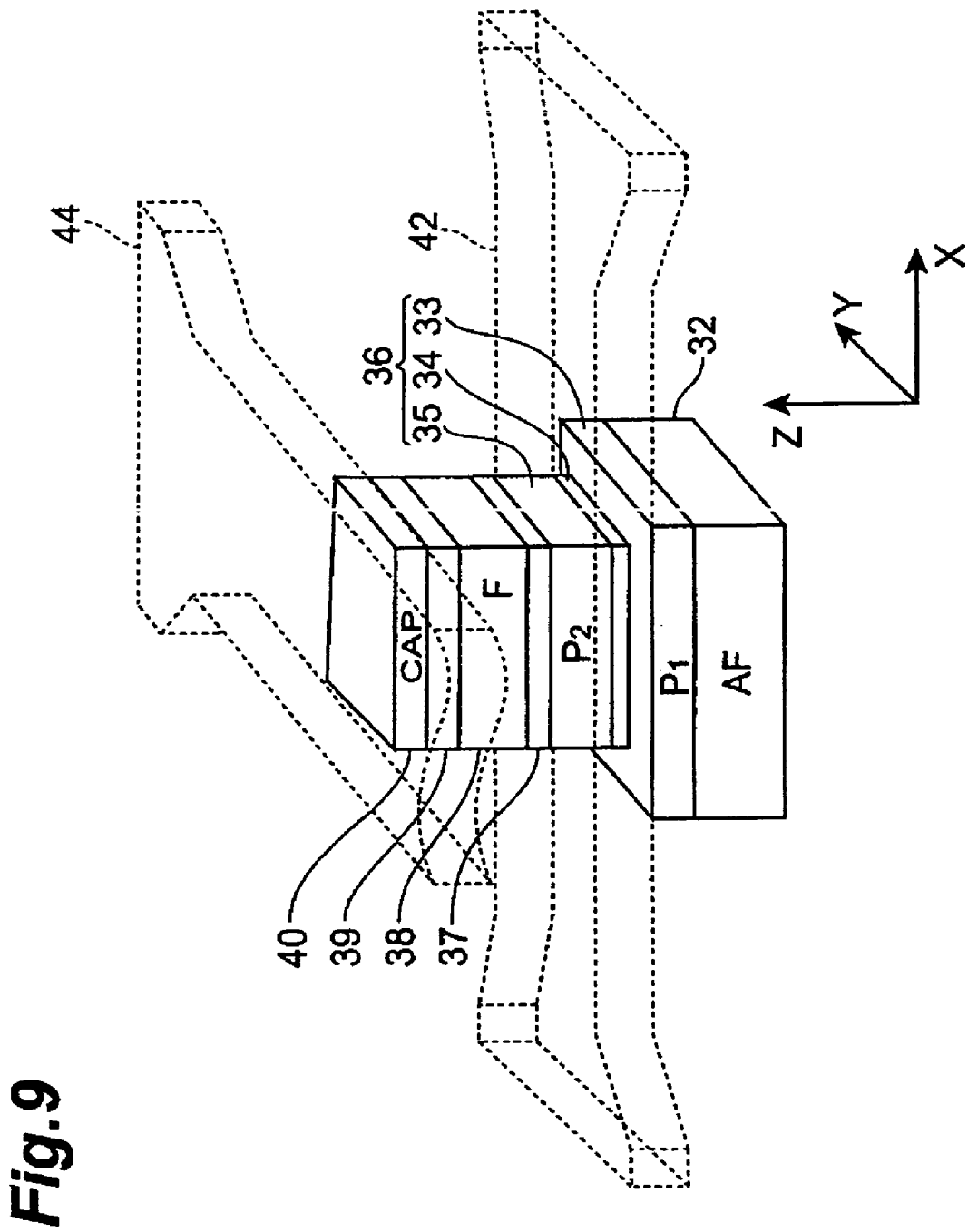
FIG. 9 is a perspective view schematically showing a thin-film magnetic head in a stage where the upper electrode layer is formed.

Subsequently, as shown in FIG. 8, an upper electrode layer 44 is deposited by sputtering, plating, IBD (Ion Beam Deposition), or the like. FIG. 9 shows a perspective view at the time when the upper electrode layer 44 is deposited (the electrode layers 42, 44 are indicated by broken lines). As shown in FIG. 9, the lower electrode layer 42 extends in the track-width direction (direction of arrow X), whereas the upper electrode layer 44 extends in the depth direction (direction of arrow Y) from the air bearing surface. By utilizing a known through hole forming technique or the like, the upper electrode layer 44 and lower electrode layer 42 are respectively connected to reproducing pads 19a, 19b shown in FIG. 11.

A reproducing head section of a thin-film magnetic head is obtained in the foregoing manner. Though not explained in detail, an induction type recording head section is formed on the reproducing head section. The recording head section may be either of a longitudinal recording type in which a thin-film coil is held between the upper and lower magnetic poles or a perpendicular recording type in which a thin-film coil is held between the main and auxiliary magnetic poles.

After the recording head section is formed so as to yield an intermediate of the thin-film magnetic head on the substrate 11 a plurality of bars are made by dicing. In each bar, a plurality of thin-film magnetic head intermediates are arranged in parallel. When such bars are made, they are lapped (ground) in order to adjust the MR height. After lapping, each bar is cut into blocks each having a thin-film magnetic head, so as to form a slider rail, thereby yielding a so-called head slider. This series of steps completes the process of making the thin-film magnetic head 10.

Though this embodiment relates to a case where the thin-film magnetic head 10 is a so-called CPP-GMR head, a TMR head is also possible. In the latter case, a tunnel barrier layer formed from a nonmagnetic insulating material is employed as the intermediate layer between the free layer and the pinned layer. The tunnel barrier layer is one through which electrons can pass while storing their spins by the tunnel effect. It has a thickness of about 0.5 nm to about 1 nm, and can be formed from an insulating material such as $Al_2O_3$, MgO, $Ta_2O_5$, $TiO_2$, or the like, for example. Especially, $Al_2O_3$ is preferred.

Each of the ferromagnetic layers 33, 35 of the pinned layer 36 and the free layer 38 may have a multilayer structure as well. The flow direction of sense current $I_s$ may also be the opposite of that shown in FIG. 1, i.e., from the pinned layer 36 to the free layer 38.

A head gimbal assembly and hard disk apparatus equipped with the thin-film magnetic head 10 will now be explained.

Figure 10:
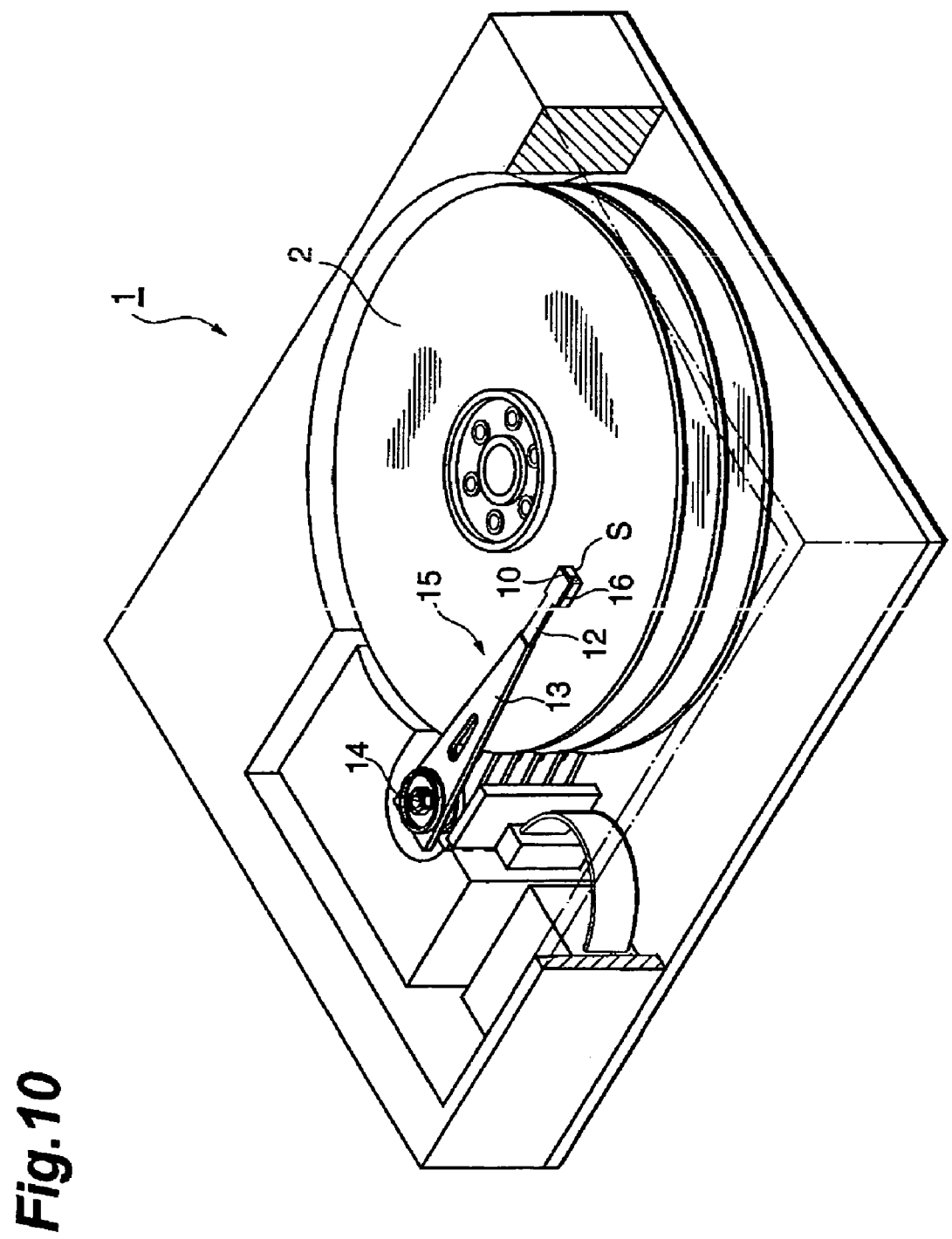
FIG. 10 is a perspective view showing an embodiment of the hard disk apparatus in accordance with the present invention.

FIG. 10 is a view showing a hard disk apparatus equipped with the thin-film magnetic head 10. The hard disk apparatus 1 is one in which a head gimbal assembly (HGA) 15 is actuated, so as to use the thin-film magnetic head 10 to record/reproduce magnetic information onto/from a recording surface of a hard disk 2, that rotates at a high speed. The head gimbal assembly 15 comprises a gimbal 12 mounted with the above-mentioned head slider 16 formed with the thin-film magnetic head 10, and a suspension arm 13 connected thereto, and is rotatable about a support shaft 14, for example, by a voice coil motor. As the head gimbal assembly 15 is rotated, the head slider 16 moves in radial directions of the hard disk 2, i.e., in directions traversing track lines.

Figure 11:
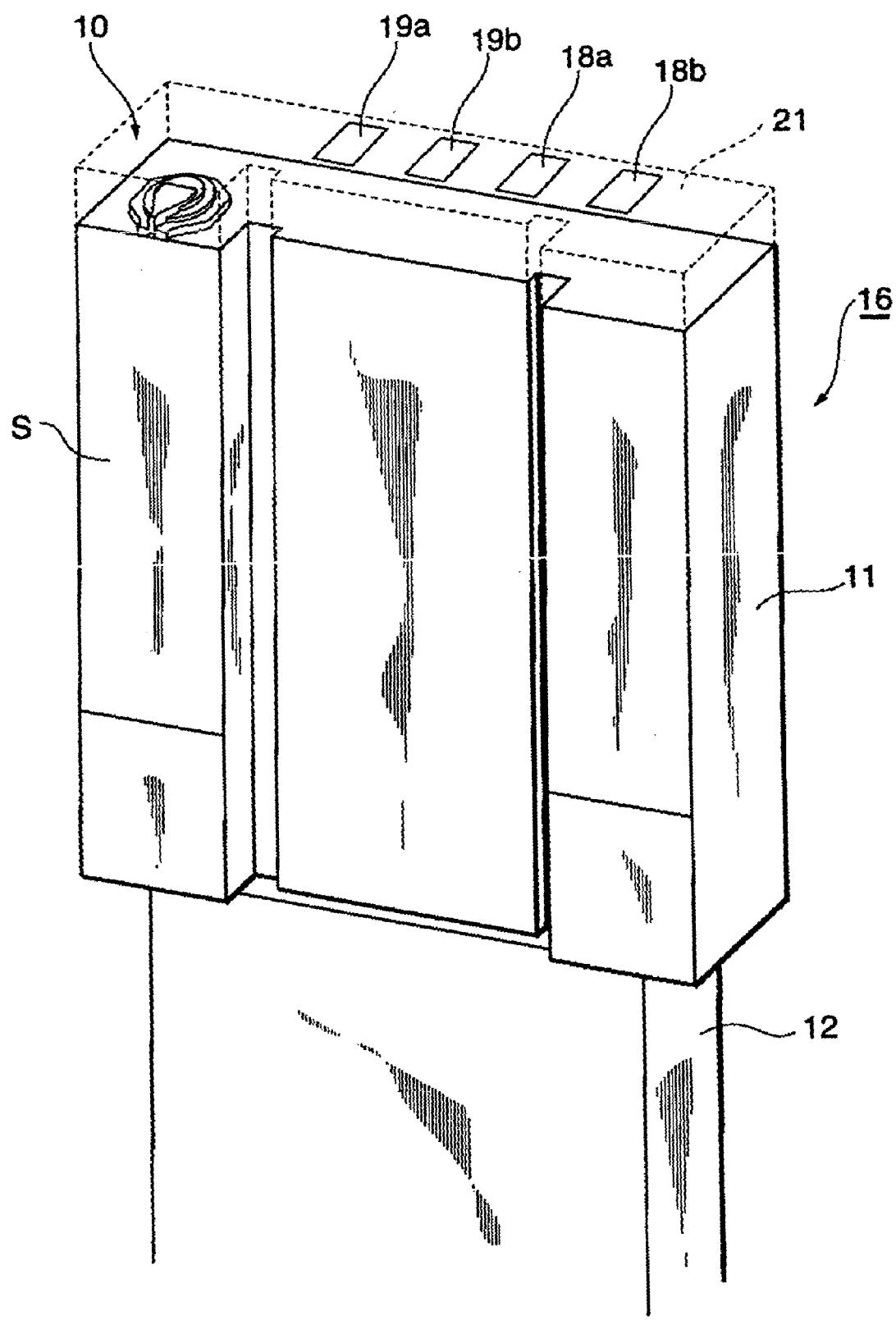
FIG. 11 is an enlarged perspective view showing a head slider mounted with the hard disk apparatus of FIG. 10.

FIG. 11 is an enlarged perspective view of the head slider 16. The head slider 16 has a substantially parallelepiped form, in which the thin-film magnetic head 10 is formed on a substrate 11. The front-side face in the drawing is an air bearing surface S opposing the recording surface of the hard disk 2. As the hard disk 2 rotates, the head slider 16 floats up due to the airflow accompanying the rotation, thereby separating the air-bearing surface S from the recording surface of the hard disk 2. Recording pads 18a, 18b and reproducing pads 19a, 19b are connected to the thin-film magnetic head 10, and electric signal input/output lines (not depicted) connected to the individual pads are attached to the suspension arm 13 shown in FIG. 10. The recording pads 18a, 18b are electrically connected to the thin-film coil of the recording head section, whereas the reproducing pads 19a, 19b are electrically connected to the upper electrode layer 44 and lower electrode layer 42 of the reproducing head section, respectively.

Since head gimbal assembly 15 and hard disk apparatus 1 are equipped with the thin-film magnetic head 10, they realize a high magnetoresistance ratio, and they are therefore able to attain a high reproducing output in the hard disk apparatus.

[Second Embodiment]

Figure 12:
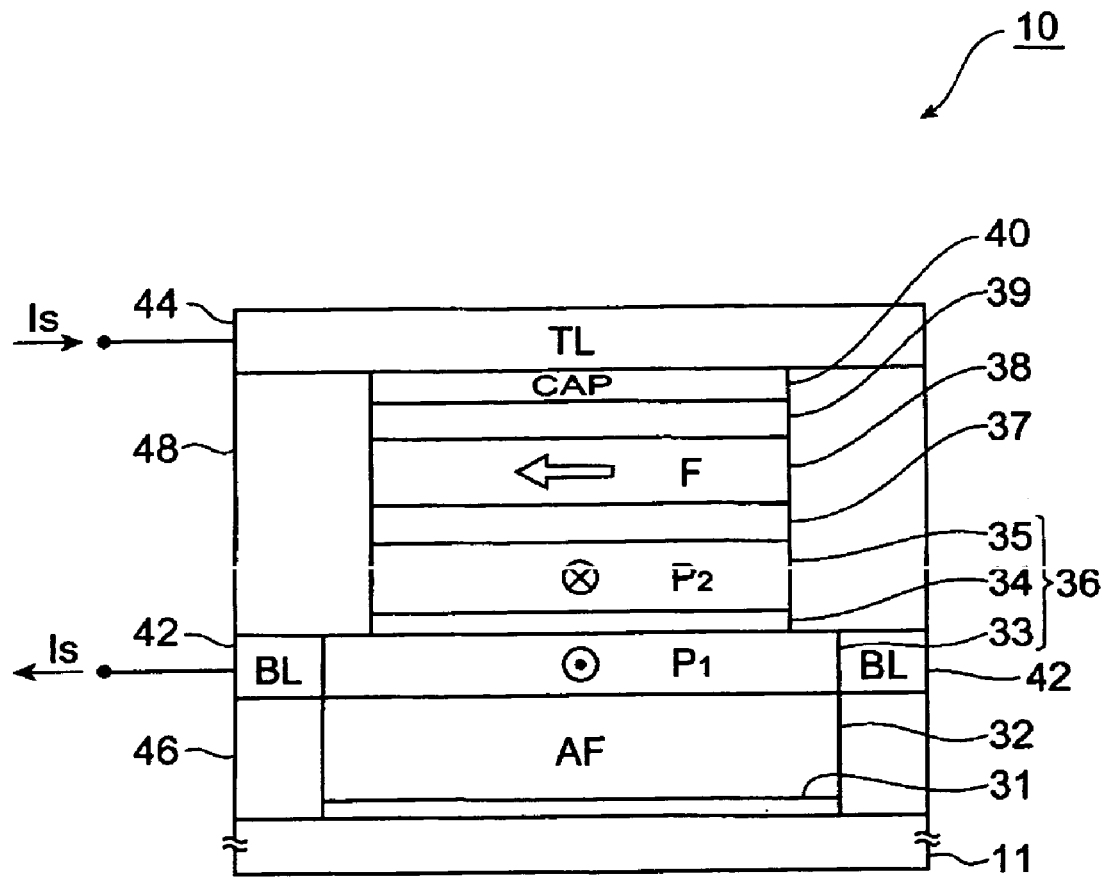
FIG. 12 is a schematic view showing the second embodiment of the thin-film magnetic head in accordance with the present invention.

Next, with reference to FIG. 12, the second embodiment of the present invention will be explained. In this embodiment, the lower electrode layer 42 is connected not to a track-width side face of the second ferromagnetic layer 35 in the pinned layer 36, but to a side face of the first ferromagnetic layer 33. In this configuration as well, basically no sense current flows through the antiferromagnetic layer 32, and therefore the development of parasitic resistance in the layer 32 can be prevented. Consequently, the magnetoresistance ratio of the thin-film magnetic head 10 can be improved. However, since the first ferromagnetic layer 33 develops an additional resistance to the MR intrinsic resistance in this embodiment, the magnetoresistance ratio obtained in the first embodiment is higher.

[Third Embodiment]

Figure 13:
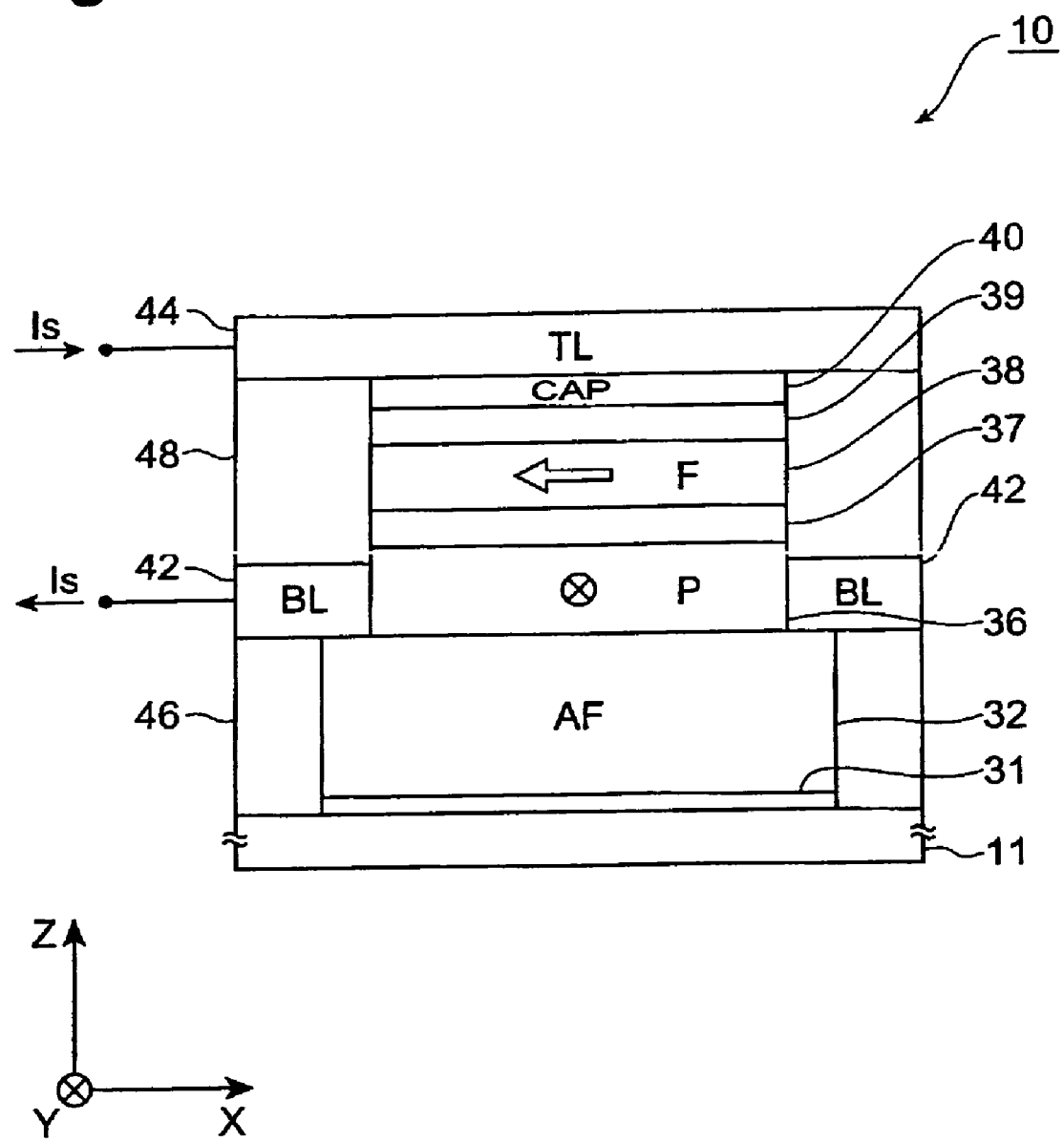
FIG. 13 is a schematic view showing the third embodiment of the thin-film magnetic head in accordance with the present invention.

Now, with reference to FIG. 13, the third embodiment of the present invention will be explained. In this embodiment, the pinned layer 36 has a single-layer structure (referred to as "P" in the drawing), and the lower electrode layer 42 is connected to a side face of the pinned layer 36. Unlike the first embodiment having a synthetic structure, there is a danger that the magnetic field of the pinned layer 36 will affect the free layer 38 in such a configuration. Nevertheless, parasitic resistance in the antiferromagnetic layer 32 can be prevented and a high magnetoresistance ratio cam be achieved.

[Fourth Embodiment]

Next, with reference to FIG. 14, the fourth embodiment of the present invention will be explained. In the thin-film magnetic head of this embodiment, a pinned layer 68, an electrically conductive layer (intermediate layer) 64, and a free layer 63 are disposed between a substrate 11 and an antiferromagnetic layer 69. Further, the lower electrode layer 61 (the other electrode layer of the pair of electrode layers that is not connected to the pinned layer 68) is disposed between the free layer 63 and the substrate 11.

The thin-film magnetic head 10 employs a CPP structure, and is provided with the lower electrode 61, a buffer layer 62, the free layer 63, the electrically conductive layer 64, the pinned layer 68, the antiferromagnetic layer 69, and an insulating layer 70 that are successively stacked on the substrate 11.

The pinned layer is formed in a so-called synthetic structure, and comprises a first ferromagnetic layer 67 in contact with the anti ferromagnetic layer 69, a nonmagnetic spacer layer 66, an upper second ferromagnetic layer 65b, and a lower second ferromagnetic layer 65a. A second ferromagnetic layer comprises the lower second ferromagnetic layer 65a and the upper second ferromagnetic layer 65b.

Each layer 65a, 65b is formed from the same material, and the directions of the magnetization of both of layer 65a and 65b are opposed to that of the first ferromagnetic layer 67. Also, the upper surface of the lower ferromagnetic layer 65a is smaller than the lower surface of the upper ferromagnetic layer 65b. The insulating layer 72 is formed around the layers from the buffer layer 62 to the lower second ferromagnetic layer 65a.

An upper electrode layer 71 is formed to surround the layers from the upper second ferromagnetic layer 65b to the insulating layer 70. The upper electrode layer 71 is constituted by a first upper electrode layer 71a and a second upper electrode layer 71b. The first upper electrode layer 71a is located to the side of the layers from the upper second ferromagnetic layer 65b to the insulating layer 70, and the second upper electrode layer 71b is located on top of the insulating layer 70 and the first upper electrode layer 71a. It is not always necessary to provide the second upper electrode layer 71b.

The materials used for the free layer 63, the electrically conductive layer 64, the pinned layer 68, the antiferromagnetic layer 69, and an insulating layer 72 can be the same as any of those mention in the previous embodiment. The lower electrode layer 61 and the upper electrode layer 71 may be formed from an electrically conductive material such as Cu, NiFe, or the like. The buffer layer 62 improves the magnetic performance of the free layer 63 and may be formed from an electrically conductive material such as Ta, NiFe, NiCr, NiFeCr, Ru, Cu, or the like. The insulating layer 70 that covers the upper surface of the antiferromagnetic layer 69 is formed from $Al_2O_3$ or the like.

The thin-film magnetic head 10 in accordance with this embodiment is configured as in the foregoing. The magnetic head thus configured yields the following effect. Since the first upper electrode layer 71a is directly connected to the pinned layer 68 and the resistance of the antiferromagnetic layer 69 is much higher than that of the first upper electrode layer 71a, the sense current flows through the free layer 63, the electrically conductive layer 64, the pinned layer 68, the first upper electrode layer 71a, and the second upper electrode layer 71b, but basically does not flow through the antiferromagnetic layer 69. As a consequence, the antiferromagnetic layer 69 does not develop the so-called parasitic resistance to the sense current, thereby yielding a high magnetoresistance ratio. Further, the thickness of the antiferromagnetic layer 69 can be increased, since it does not develop parasitic resistance. As a result, the magnetization of the pinned layer 68 becomes stable due to high pinning field.

Also, in this embodiment, the free layer 63 and the pinned layer 68 are disposed between the substrate 11 and the antiferromagnetic layer 69. In this case, a method in which a buffer layer 62 is formed on the lower electrode layer 61 and the free layer 63 is formed thereon can be performed. Therefore, it is easier to control the growth of the free layer 63, thereby increasing the sensitivity of the free layer 63.

A small amount of sense current may flow in the antiferromagnetic layer 69. However, the insulating layer 70 insulates the antiferromagnetic layer 69 from the second upper electrode layer 71b and thereby prevents the sense current from flowing across the boundary between the antiferromagnetic layer 69 and the second upper electrode layer 71b. It is not always necessary to provide the insulating layer 70, and the structure without the insulating layer 70 may also be employable.

A method of making a thin-film magnetic head in accordance with the present invention will now be explained with reference to FIGS. 15 to 19.

Figure 15:
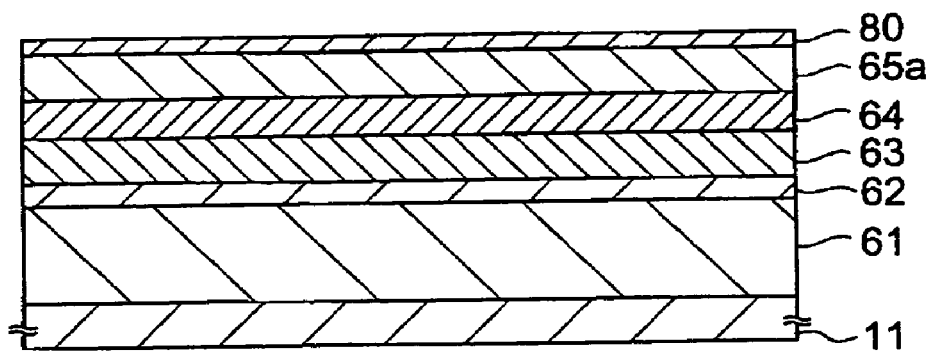
FIGS. 15 to 19 are views showing steps in the manufacture of the thin-film magnetic head of the fourth embodiment.

First, as shown in FIG. 15, the lower electrode layer 61 is formed on the substrate 11, for example, by sputtering, plating, or ion beam deposition. Subsequently, the buffer layer 62, free layer 63, electrically conductive layer 64, the lower second ferromagnetic layer 65a of the pinned layer 68, and the cap layer 80 are formed in this order by, for example, sputtering. The cap layer 80 prevents the layers thereunder from oxidizing and is formed from Ta or the like.

Figure 16:
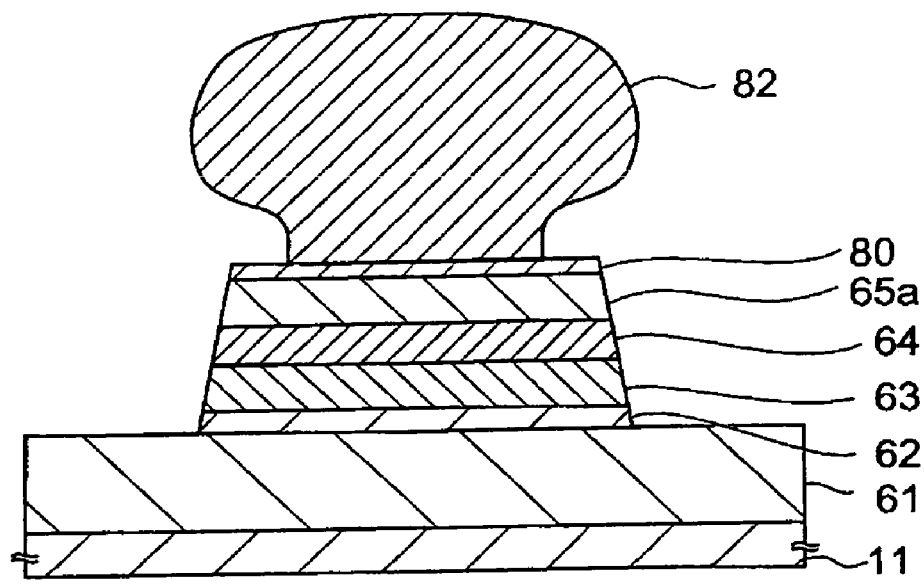

Next, as shown in FIG. 16, a mask is formed on the cap layer 80, and the buffer layer 62, the free layer 63, the electrically conductive layer 64, the lower second ferromagnetic layer 65a, and the cap layer 80 are patterned in conformity to the mask form by, for example, ion milling. The mask 82 can be formed by, for example, using photolithography techniques as mentioned above.

Figure 17:
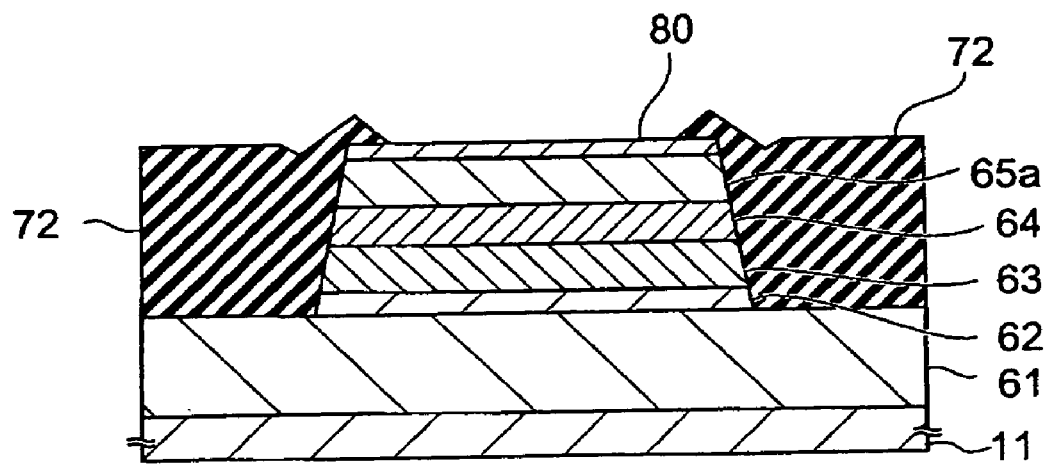

With reference to FIG. 17, the next step will be explained. First, while the mask 82 remains in place, the insulating layer 72 is deposited on the whole surface of the intermediate, for example, by sputtering. Subsequently, the mask 82 is peeled off so as to carry out lift off, thereby removing the mask 82 with the materials deposited thereon.

Figure 18:
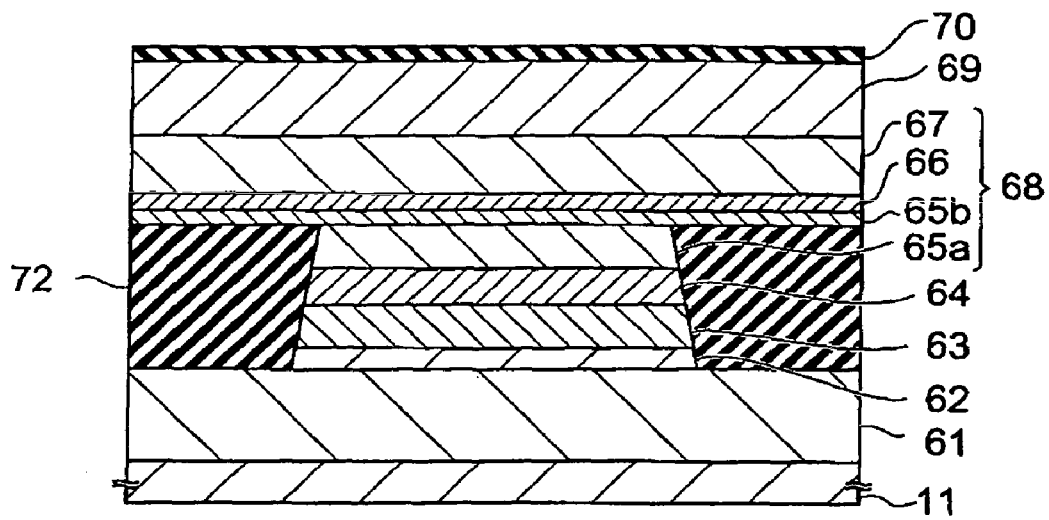

With reference to FIG. 18, the next step will be explained. First, the cap layer 80 is removed and the surface of the intermediate is flattened by etching. Subsequently, the upper second ferromagnetic layer 65b, the nonmagnetic spacer layer 66, the first ferromagnetic layer 67, the antiferromagnetic layer 69, and the insulating layer 70 are stacked in this order, for example, by etching. The upper second ferromagnetic layer 65b is formed from the same material as the lower second ferromagnetic layer 65a. By forming the second ferromagnetic layer through two stages, the coupling of the upper layer with the second ferromagnetic layer is improved.

Figure 19:
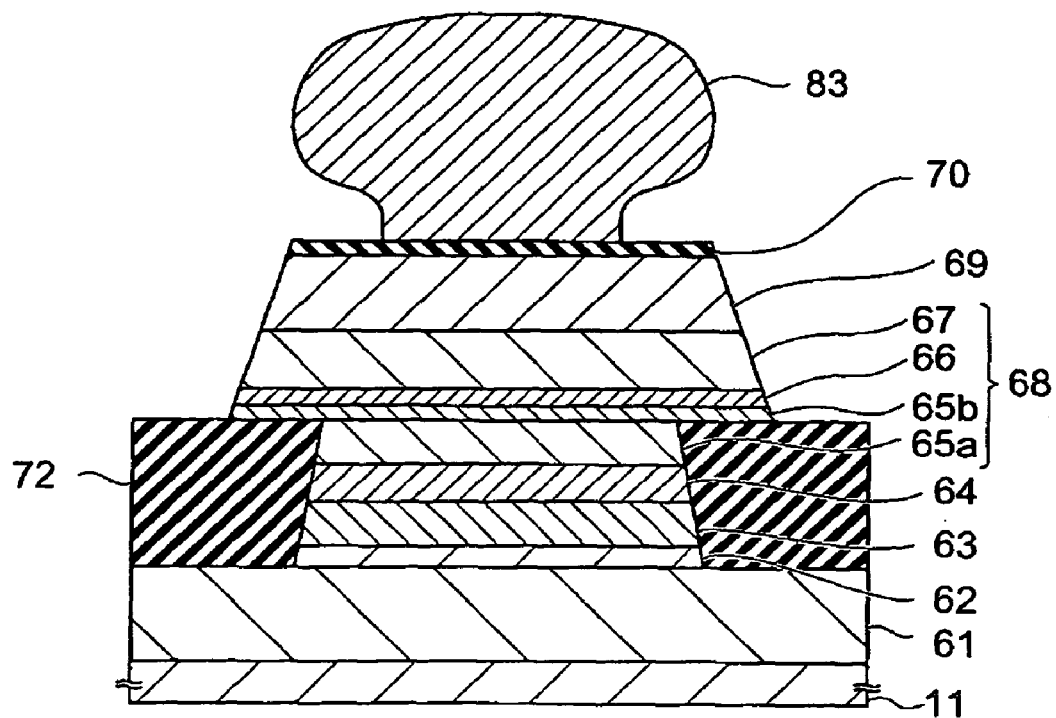

Next, as shown in FIG. 19, the mask 83 is formed on the insulating layer 70, and the layer from the insulating layer 70 to the upper second ferromagnetic layer 65b is patterned in conformity to the mask form, for example, by ion milling.

Figure 14:
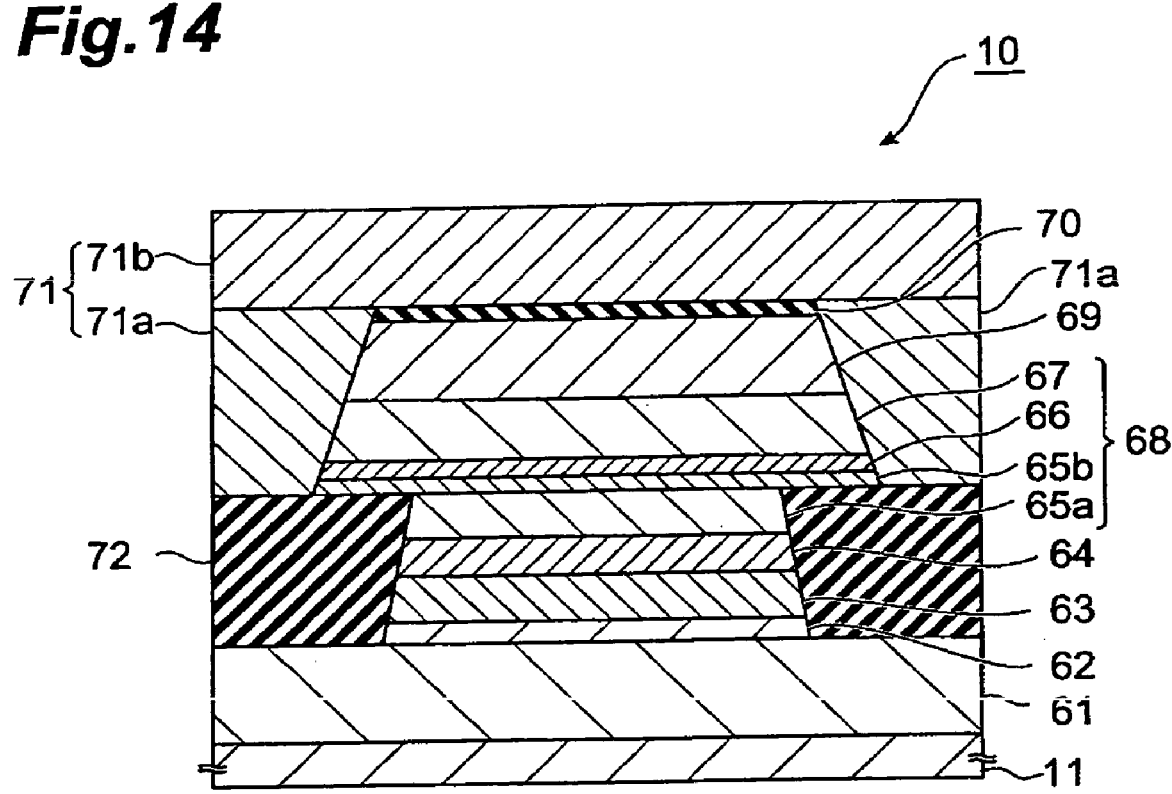
FIG. 14 is a sectional view showing the fourth embodiment of the thin-film magnetic head in accordance with the present invention.

With reference to FIG. 14, the next step will be explained. First, while the mask 83 remains in place, the first upper electrode layer 71a is formed, for example, by sputtering, plating, ion beam deposition or the like. Subsequently, the mask 83 is peeled off so as to carry out lift off, thereby removing the mask with the materials deposited thereon. Thereafter, the second upper electrode layer 71b is formed on the first upper electrode layer 71a and the insulating layer 70, for example, by sputtering, plating, ion beam deposition, or the like. Thus, the thin-film magnetic head of the present embodiment is obtained.

EXAMPLES

Effects of the present invention will now be explained more specifically with reference to the Examples.

Example 1 is a thin-film magnetic head corresponding to the first embodiment (see FIG. 1). Namely, the upper electrode layer 44 was connected to the upper face of the cap layer 40, and the lower electrode layer 42 was connected to a side part of the second ferromagnetic layer 35 in the pinned layer 36. Table 1 shows the thickness and materials that form each layer.

TABLE 1

| LAYER (NUMERALS CORRESPOND TO THOSE IN FIG. 1) | MATERIAL | THICKNESS (UNIT: ANGSTROM) |
| --- | --- | --- |
| 8 CAP LAYER 40 | Ta | 10 |
| 7 ELECTRICALLY CONDUCTIVE LAYER 39 | Cu | 20 |
| 6 FREE LAYER 38 | CoFe | 40 |
| 5 ELECTRICALLY CONDUCTIVE LAYER (INTERMEDIATE LAYER) 37 | Cu | 20 |
| 4 SECOND FERROMAGNETIC LAYER 35 | CoFe | 40 |
| 3 NONMAGNETIC SPACER LAYER 34 | Ru | 8 |
| 2 FIRST FERROMAGNETIC LAYER 33 | CoFe | 30 |
| 1 ANTIFERROMAGNETIC LAYER 32 | PtMn | 150 |

Example 2 is a thin-film magnetic head corresponding to the second embodiment (see FIG. 2). The materials for forming the individual layers were the same as those in Example 1. However the lower electrode layer 42 was connected to the side face of the first ferromagnetic layer 33 in the pinned layer 36.

The Comparative Example had the lower electrode layer connected to the side of the antiferromagnetic layer 32 opposite to the side where the pinned layer was located as in conventional cases.

The magnetoresistance ratio was obtained for Examples 1 and 2 and the Comparative Example according to the following expression (1):

$$MR(\text{magnetoresistance ratio}) = (A \cdot \Delta R)/(A \cdot R_{total}) \times 100\ (\%) \quad (1)$$

where $A \cdot \Delta R$ is the maximum resistance change (difference between the resistance value when the respective magnetizations of the free layer and pinned layer are parallel and the resistance value when they are in anti-parallel) multiplied by the cross-sectional area of the layer and is expressed in terms of $m\Omega \cdot \mu m^2$; whereas $R_{total}$ is the total resistance value of the layer through which the sense current flows.

The result thus obtained was 1.36% in the Comparative Example, whereas Examples 1 and 2 yielded high magnetoresistance ratios of 25.45% and 7.48%, respectively. Simulations for Examples 1 and 2 yielded magnetoresistance ratios of 37.9% and 9.66% respectively. Thus the actually measured values were found to be close to the simulation result.

As explained in the foregoing, the present invention can prevent the antiferromagnetic layer from developing parasitic resistance to the sense current, and, therefore, it is able to yield a high magnetoresistance ratio.

The basic Japanese Application No. 2002-279569 filed on Nov. 20, 2002 is hereby incorporated by reference.

What is claimed is:

1. A thin-film magnetic head comprising:
   an antiferromagnetic layer;
   a pinned layer whose direction of magnetization is fixed by exchange-coupling with said antiferromagnetic layer;
   a free layer whose direction of magnetization varies according to external magnetic field;
   an intermediate layer disposed between said pinned layer and said free layer; and
   a pair of electrode layers for supplying a sense current to the free layer in a layer thickness direction of said free layer,
   a first electrode layer of the pair of electrode layers contacting said pinned layer and a second electrode layer of the pair of electrode layers being placed above the free layer on a side opposite the pinned layer so as to cover the free layer.

2. A thin-film magnetic head according to claim 1, wherein said pinned layer comprises a first ferromagnetic layer in contact with said antiferromagnetic layer, a second ferromagnetic layer whose direction of magnetization is opposite to that of said first ferromagnetic layer, and a nonmagnetic spacer layer disposed between said first and second ferromagnetic layers;
   said first electrode layer connected to said pinned layer being in contact with a track-width side face of said second ferromagnetic layer but not in contact with a track-width side face of said first ferromagnetic layer.

3. A thin-film magnetic head according to claim 2, wherein a face of said second ferromagnetic layer opposing said first ferromagnetic layer has an area smaller than that of a face of said first ferromagnetic layer opposing said second ferromagnetic layer.

4. A thin-film magnetic head according to claim 1, wherein said pinned layer, said intermediate layer, and said free layer are disposed between a substrate and said antiferromagnetic layer,
   the second electrode layer of said pair of electrode layers that is not connected to the pinned layer is disposed above and in contact with the first electrode layer, and
   the antiferromagnetic layer, the pinned layer and the free layer are disposed between the second electrode layer and a third electrode layer.

5. A thin-film magnetic head according to claim 1, wherein said intermediate layer is formed from an electrically conductive material.

6. A head gimbal assembly having a thin-film magnetic head mounted with a gimbal;
   said thin-film magnetic head comprising:
   an antiferromagnetic layer;
   a pinned layer whose direction of magnetization is fixed by exchange-coupling with said antiferromagnetic layer;

a free layer whose direction of magnetization varies according to external magnetic field;

an intermediate layer disposed between said pinned layer and said free layer; and a pair of electrode layers for supplying a sense current in a layer thickness direction of said free layer, a first electrode layer of the pair of electrode layers contacting said pinned layer and a second electrode layer of the pair of electrode layers being placed above the free layer on a side opposite the pinned layer so as to cover the free layer.

7. A hard disk apparatus comprising a hard disk adapted to write magnetic information therein, and a thin-film magnetic head for reading said magnetic information on said hard disk;

said thin-film magnetic head comprising:

an antiferromagnetic layer;

a pinned layer whose direction of magnetization is fixed by exchange-coupling with said antiferromagnetic layer;

a free layer whose direction of magnetization varies according to external magnetic field;

an intermediate layer disposed between said pinned layer and said free layer; and a pair of electrode layers for supplying a sense current in a layer thickness direction of said free layer, a first electrode layer of the pair of electrode layers contacting said pinned layer and a second electrode layer of the pair of electrode layers being placed above the free layer on a side opposite the pinned layer so as to cover the free layer.

* * * * *